Figure 4:
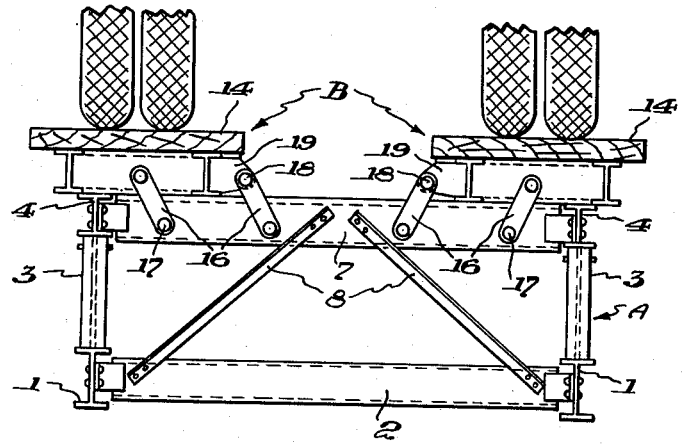

Aug. 4, 1953  H. J. WOOLSLAYER ET AL  2,647,606
TRUCK RAMP
Filed Sept. 29, 1950  2 Sheets-Sheet 1
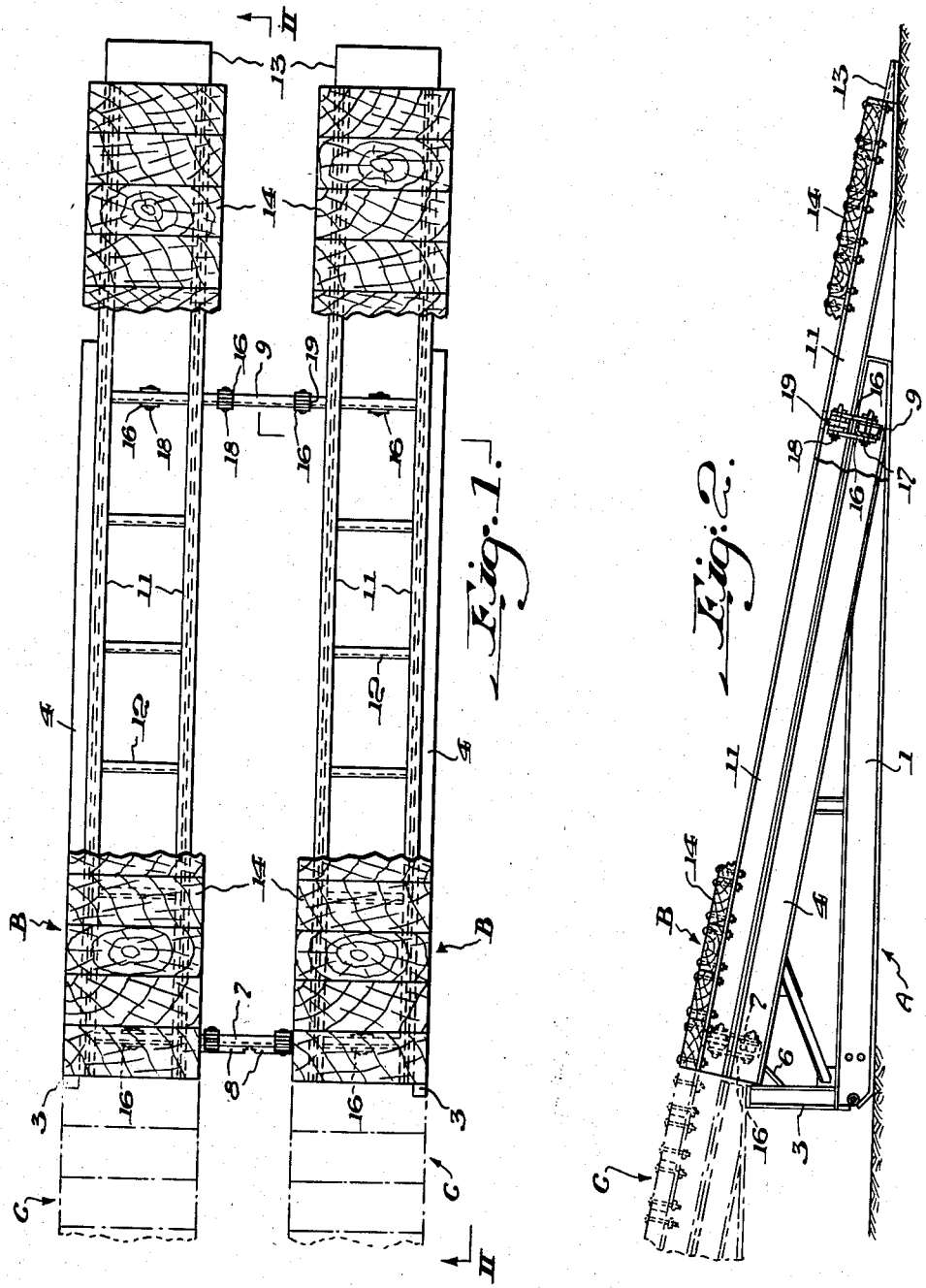
INVENTORS.
HOMER J. WOOLSLAYER, &
CHARLES D. IDDINGS.
BY
Brown, Critchlow, Flick & Peckham
their ATTORNEYS.

Aug. 4, 1953 H. J. WOOLSLAYER ET AL 2,647,606
TRUCK RAMP
Filed Sept. 29, 1950 2 Sheets-Sheet 2

INVENTORS.
HOMER J. WOOLSLAYER, &
CHARLES D. IDDINGS.
BY Brown, Critchlow, Flick & Peckham
their
ATTORNEYS.

Patented Aug. 4, 1953

2,647,606

UNITED STATES PATENT OFFICE 2,647,606

TRUCK RAMP

Homer J. Woolslayer and Charles D. Iddings, Tulsa, Okla., assignors to Lee C. Moore Corporation, Pittsburgh, Pa., a corporation of Pennsylvania Application September 29, 1950, Serial No. 187,398

6 Claims. (Cl. 193—41)

This invention relates to ramps, up which trucks can be driven, and more particularly to ramps for use in oil well fields.

In assembling equipment for oil well drilling it often is found that a piece of machinery, which is too heavy to lift with available equipment, must be unloaded from a truck onto a support at an elevation considerably higher than the level of the truck bed. To do this, it is the usual practice to drive the truck up a ramp until the truck bed aligns with the floor of the substructure on which the machinery is to be placed. Then the machinery is skidded off the truck bed and onto the substructure. In order to do this, it is frequently necessary to bring the ramp many miles to a location where it may be used for a very short time and where it would be uneconomical to spend much time in assembling and disassembling the ramp structure. A problem that arises is that the laws of most of the states limit the width of a vehicle and its load on highways to eight feet. This limitation causes many manufacturers of the large trucks commonly used for transportation of heavy oil field equipment to establish the width over the tires at eight feet. Since it requires considerable skill and effort to drive a large truck up a ramp no wider than the width of the truck over the tires, it is highly desirable that the ramp width be greater than eight feet, but for transportation the ramp must be no wider than eight feet. Therefore, narrower ramps which constitute a hazard to the worker frequently have been used. Also ramps have been built which can be disassembled for transportation, but they require time and labor to disassemble and reassemble them.

It is among the objects of this invention to provide a truck ramp which has ample width for accommodating wide trucks, which can be reduced in width for transportation, which can have its width changed in this manner without removing any parts, and which can have its width changed quickly and with little effort.

In accordance with this invention, a pair of parallel elongated track units are supported by a rigid base. The track units extend lengthwise of the base to form tracks for truck wheels, the upper surfaces of the units being inclined lengthwise to raise the wheels as they are rolled up the tracks. The track units are movably connected to the base for lateral movement away from each other so that they can be moved from positions that are substantially entirely between the opposite sides of the base to positions in which the units will overhang the sides of the base. When the track units are in their inner positions, the ramp can be transported over highways from one location to another. When the track units are in their outer positions, they are far enough apart to provide adequate track space for widely spaced truck wheels. Preferably, the track units are connected to the base by inclined links which are pivoted at their ends to the base and track units. With such an arrangement the track units can be swung toward and away from each other.

Figure 3:
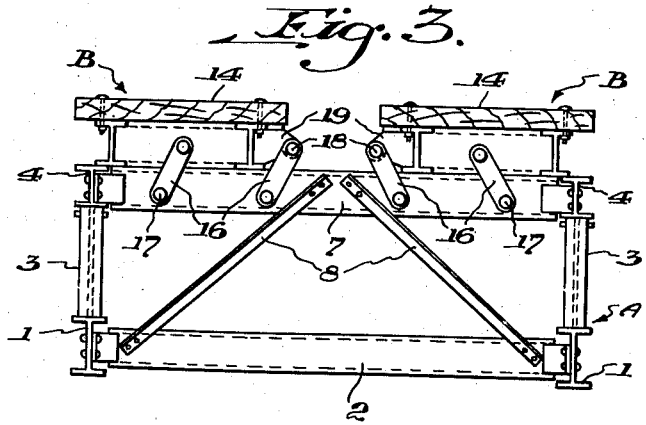

The preferred embodiment of the invention is illustrated in the accompanying drawings, in which Fig. 1 is a plan view of the ramp; Fig. 2 is a combined side view and section taken on the line II—II of the Fig. 1; Fig. 3 is an end view of the higher end of the ramp; and Fig. 4 is a view similar to Fig. 3, but showing the track units in their outer or operative positions.

Referring to the drawings, the stationary base A of the ramp includes a pair of spaced, parallel, horizontal I-beams 1 rigidly connected near one end by a cross member 2. Mounted on top of the same ends of the I-beams are vertical posts 3. Extending from near the top of these posts downward across the wedge-shape opposite ends of beams 1 are inclined I-beams 4. The upper ends of the inclined beams do not rest on top of the posts, but are supported from the sides of them by brackets 6, as shown in Fig. 2. Near their upper ends the inclined beams are rigidly connected by a cross channel 7 which is connected by diagonal braces 8 to cross member 2 below it. The lower ends of the inclined beams likewise are connected by a cross channel 9. The inclination of beams 4 is that which is desired for the ramp.

The base thus formed supports a pair of parallel, rectangular units B that are designed to form tracks for the wheels of a truck which is to be driven (generally backed) up the ramp. Each track unit is constructed from a pair of spaced, parallel I-beams 11 forming side members which are rigidly connected by several cross channels 12 and by a wedge-shape plate 13 at their lower ends. Bolted to the tops of the side members are planks 14 that form a floor for the wheels of a truck. The track units extend lengthwise of the base from the upper ends of the inclined base beams 4 to points beyond their lower ends. As shown in Fig. 2, the lower end portions of track unit beams 11 are cut off in a horizontal plane so that they can rest flat on the ground. The track units are supported by the cross channels 7 and 9 of the base and by the inclined side members of the base.

The track units are not rigidly mounted on the base, but are movable toward and away from each other within fixed limits. They are attached to the base by means of pivoted links 16. When the track units are resting flat on the base, the links are inclined transversely of the base. In the particular construction shown, each track unit is connected to the base by two pairs of parallel links. The lower ends of these links are connected by pivots 17 to the two base channels 7 and 9, while their upper ends are connected by pivots 18 to the overlying track unit channels and brackets 19 projecting inward from the inner side member 11 of the unit. Consequently, the two track units can be moved away from each other by swinging them laterally through an arc that rises above the base. When they are swung outward from the positions shown in Fig. 3 the links 16 first will raise the track units and then will permit them to again be seated on the base as shown in Fig. 4. In the latter position, it is preferred that the outer side members 11 of the track units rest for support on the outer edges of the inclined beams 4 of the base. The cross channels 12 of the units also rest on those beams, and inner side members 11 rest on base channels 7 and 9. The length of the links is such that when the track units are in their inner positions, as shown in Fig. 3, they do not project beyond the opposite sides of the base when the base is the maximum width allowed for highway transportation. Yet, when the track units are swung to their outer positions for supporting truck wheels, as shown in Fig. 4, they overhang the opposite sides of the base far enough to provide tracks of sufficient width for safe operation of a truck over them.

With this construction, the width of the ramp is adequate when in use, but it may be reduced for transportation over highways where there are load width limitations. This can be done without recourse to any assembling or disassembling work. The ramp can be placed in operative condition or in condition for transportation very quickly and with little effort by merely swinging the track units away from or toward each other, as the case may be. If it is desired to use this ramp with similar ramps, so that a truck can be driven to a greater height, the lower end of the added ramp C (indicated by broken lines in Fig. 2) can be seated on the upper ends of base posts 3.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A truck ramp comprising a rigid base, a pair of parallel elongated track units supported on said base and extending lengthwise thereof to form tracks for truck wheels, and means movably connecting said units to the base for lateral movement away from each other from transportation positions substantially entirely between the opposite sides of the base to operative positions overhanging said sides, the upper surfaces of said units being inclined lengthwise to raise said wheels when they are rolled up the track units.

2. A truck ramp comprising a rigid base, a pair of parallel elongated track units supported on said base and extending lengthwise thereof to form tracks for truck wheels and a plurality of links inclined transversely of said base and pivotally connected at their ends to the base and track units, whereby said units can be swung up and away from each other from transportation positions substantially entirely between the opposite sides of the base and then down to operative positions overhanging said sides, the upper surfaces of said units being inclined lengthwise to raise said wheels when they are rolled up the track units.

3. A truck ramp comprising a rigid base, a pair of parallel elongated track units supported on said base and extending lengthwise thereof to form tracks for truck wheels, and a plurality of pairs of parallel links pivotally connected at their ends to each track unit and the base and inclined upward and toward the other track unit, whereby said units can be swung up and away from each other from transportation positions substantially entirely between the opposite sides of the base and then down to operative positions overhanging said sides, the upper surfaces of said units being inclined lengthwise to raise said wheels when they are rolled up the track units.

4. A truck ramp comprising a base having a pair of spaced parallel side members rigidly connected by cross members, a pair of parallel elongated track units supported on said base and extending lengthwise of said side members to form tracks for truck wheels, and means movably connecting said units to said cross members for lateral movement away from each other from transportation positions substantially entirely between the opposite sides of the base to operative positions overhanging said side members, the upper surfaces of said units being inclined lengthwise to raise said wheels when they are rolled up the track units.

5. A truck ramp comprising a base having a pair of spaced parallel side members rigidly connected by cross members, a pair of parallel elongated track units supported on said base and extending lengthwise of said side members to form tracks for truck wheels, each of said track units having spaced parallel side members rigidly connected by cross members, and pivoted links movably connecting said track unit cross members to said base cross members to permit said units to be swung away from each other from transportation positions substantially entirely between the opposite sides of the base to operative positions in which the track unit outer side members overhang the base side members, the upper surfaces of said units being inclined lengthwise to raise said wheels when they are rolled up the track units.

6. A truck ramp comprising a base having a pair of spaced parallel inclined side members rigidly connected by cross members, a pair of parallel elongated track units supported on said base and extending lengthwise of said side members to form tracks for truck wheels, each of said track units having spaced parallel inclined side members rigidly connected by cross members, and pairs of parallel links pivotally connected at their ends to said track unit cross members and said base cross members and inclined transversely of the base, whereby said units can be swung up and away from each other from transportation positions substantially entirely between the opposite sides of the base and then down to operative positions in which the track unit outer side members overhang the base side members.

HOMER J. WOOLSLAYER.
CHARLES D. IDDINGS.

References Cited in the file of this patent

UNITED STATES PATENTS

| Number | Name | Date |
|---|---|---|
| 614,796 | Denniston | Nov. 22, 1898 |
| 837,372 | Adams | Dec. 4, 1906 |
| 2,436,467 | Winter | Feb. 24, 1948 |

FOREIGN PATENTS

| Number | Country | Date |
|---|---|---|
| 569,891 | Great Britain | June 13, 1945 |